3,819,760
PROCESS FOR PREPARATION OF UNSATURATED POLYESTER
Yuzo Aito, Tokyo, Takeshi Fujii, Noritsugu Saiki, and Shuji Irie, Iwakuni, and Yasukuni Nakatsuji, Sagamihara, Japan, assignors to Teijin Limited, Osaka, Japan
No Drawing. Filed July 13, 1972, Ser. No. 271,408
Int. Cl. C08f 21/02
U.S. Cl. 260—861                                                10 Claims

ABSTRACT OF THE DISCLOSURE

Improved process for producing an unsaturated polyester which comprises reacting a polyhydric alcohol component composed of not more than 50 mol percent of a compound selected from the group consisting of propylene glycol, propylene oxide, diethylene glycol and dipropylene glycol and 50 to 100 mol percent of ethylene oxide and/or ethylene glycol with a dicarboxylic acid component composed of 90 to 20 mol percent of an unsaturated aliphatic dicarboxylic acid or its acid anhydride and 10 to 80 mol percent of a methyl-substituted benzenedicarboxylic acid which may contain up to 20 mol percent of another saturated dicarboxylic acid, the amounts of said ethylene glycol and/or ethylene oxide and said methyl-substituted benzenedicarboxylic acid being defined by the following formula $$3/7(x-30) \leq y$$

wherein $x$ is the mol percent of the ethylene glycol and/or ethylene oxide in said polyhydric alcohol component, and $y$ is the mol percent of the methyl-substituted benzenedicarboxylic acid in said dicarboxylic acid component.

---

This invention relates to a process for preparing an unsaturated polyester having superior solubility in a copolymerizable monomer to form a stable solution and capable of giving a cured product having improved thermal resistance, flexural modulus and resistance to organic solvents.

More specifically, the invention relates to an improved process for preparing an unsaturated polyester having improved properties which comprises reacting a polyhydric alcohol composed of not more than 50 mol percent of a compound selected from the group consisting of propylene glycol, propylene oxide, diethyleneglycol and dipropylene glycol and 50 to 100 mol percent of ethylene glycol and/or ethylene oxide with a dicarboxylic acid component composed of 90 to 20 mol percent of an unsaturated aliphatic dicarboxylic acid or its anhydride and 10 to 80 mol percent of a methyl-substituted benzene dicarboxylic acid containing not more than 20 mol percent, preferably not more than 10 mol percent of another saturated dicarboxylic acid, the amounts of said ethylene glycol and/or ethylene oxide and said methyl-substituted benzenedicarboxylic acid being defined by the following equation $$3/7(x-30) \leq y$$

wherein $x$ is the mol percent of the ethylene glycol and/or ethylene oxide in said polyhydric alcohol component and $y$ is the mol percent of said methyl-substituted benzenedicarboxylic acid in said dicarboxylic acid component.

Unsaturated polyesters have previously been produced by polycondensing unsaturated aliphatic dicarboxylic acids or mixtures of unsaturated aliphatic dicarboxylic acids and saturated dicarboxylic acids with polyhydric alcohols. Especially, unsaturated polyesters obtained from maleic anhydride, phthalic anhydride and propylene glycol are cross-linked with a copolymerizable monomer such as styrene and thus find various applications as building material, paints and lacquers, cast articles, etc. These unsaturated polyesters have inferior thermal resistance and resistance to chemicals, and their use is limited. In an attempt to remedy this defect, a method has been proposed which uses isophthalic acid or terephthalic acid instead of the phthalic anhydride. Since, however, isophthalic acid or terephthalic acid has poor solubility in polyhydric alcohols, long periods of time are required for reaction, and most of the reaction is carried out in the heterogeneous phase. In addition, cured products of an unsaturated polyester obtained by this method have unsatisfactory resistance to chemicals, especially to organic solvents such as benzene.

Ethylene glycol, one of the polyhydric alcohols used for preparing unsaturated polyesters, has the advantage that it leads to a high rate of esterification reaction and does not impart coloration to the resulting esterification product as compared with propylene glycol which yellows the esterification product. Furthermore, a cured product of an unsaturated polyester obtained by using ethylene glycol as the polyhydric alcohol has superior resistance to organic solvents such as benzene and superior mechanical properties such as flexural modulus as compared to a cured product of an unsaturated polyester obtained by using propylene glycol as the polyhydric alcohol.

However, the unsaturated polyester obtained by using ethylene glycol as the polyhydric alcohol has the serious defect that it has very low solubility in a copolymerizable monomer such as styrene and when mixed with a copolymerizable monomer, the mixture is separated, and a uniform, transparent unsaturated polyester cannot be obtained. Moreover, this defect becomes conspicuous when isophthalic acid or terephthalic acid is used as a part of the acid component. Therefore, the amount of ethylene glycol used as a polyhydric alcohol is limited to 30 mol percent at most of the total amount of the polyhydric alcohol. It has thus been impossible to produce unsaturated polyesters having superior thermal resistance and resistance to chemicals.

U.S. Pat. 3,196,131 proposes the utilization of a benzenedicarboxylic acid such as isophthalic acid or terephthalic acid. According to this proposal, a superior laminating resin is obtained with a saving of reaction time by the use of two dihydric alcohol reactants of different carbon atom content in which one of the alcohols contains at least four carbon atoms in a two-step reaction process, where the higher boiling alcohol is charged to the first reaction step along with the benzenedicarboxylic acid and an unsaturated acid, the other dihydric alcohol and remaining first alcohol, if any, are then charged in the second reaction step. According to this proposal, the use of alcohols having 4 or more carbon atoms as one polyhydric alcohol component is essential, and in a major amount. As will be shown by Comparative Examples given hereinbelow together with Examples, the use of a substantial amount of a polyhydric alcohol component of four or more carbon atoms, such as glycols or ether glycols, should be avoided.

According to the process of the present invention, there is used a polyhydric alcohol component at least 50 mol percent, preferably at least 70 mol percent, of which is ethylene glycol and/or ethylene oxide and which contains not more than 50 mol percent, preferably not more than 30 mol percent, of other glycol. It has been found that by using this particular polyhydric alcohol component, there can be obtained an unsaturated polyester having very much improved solubility in a copolymerizable monomer such as styrene to form a stable solution, and that contrary to the expectation from the utilization of isophthalic acid or terephthalic acid, there can be obtained an unsaturated polyester which when cured, has improved resistance to organic solvents. It has also been found that together with the achievement of these unexpected advantages, the rate of reaction can be further improved and other properties of the cured product, such as heat resistance or flexural modulus, can also be bettered. In order to achieve these advantages, the amounts of ethylene glycol and the methyl-substituted benzene dicarboxylic acid which are defined by the formula given above are essential in conjunction with the specific mol percent of these compounds.

Accordingly, it is an object of this invention to provide an improved process for producing an unsaturated polyester having improved properties as mentioned above at improved rates of reaction and with good reproducibility of quality.

Many other objects and advantages of this invention will become apparent from the following description.

The polyhydric alcohol component used in this invention contains a major proportion of ethylene glycol and/or ethylene oxide, and up to 50 mol percent, preferably up to 30 mol percent, of a compound selected from the group consisting of propylene glycol, diethylene glycol, dipropylene glycol and propylene oxide. If the amount of ethylene glycol and/or ethylene oxide is less than 50 mol percent, the resistance to organic solvents and the flexural modulus of a cured product of the polyester obtained in this invention cannot be improved.

The dicarboxylic acid component used in the process of this invention consists of 90–20 mol percent of an unsaturated aliphatic dicarboxylic acid having 4 to 6 carbon atoms or its acid anhydride and 10 to 80 mol percent of a methyl-substituted benzenedicarboxylic acid. Examples of the unsaturated dicarboxylic acid or its acid anhydride include maleic acid, fumaric acid, itaconic acid, citraconic acid, maleic anhydride, itaconic anhydride, or citraconic anhydride.

The methyl-substituted benzenedicarboxylic acid includes, for example, methylterephthalic acid, 4-methylisophthalic acid and 5-methylisophthalic acid.

The methylterephthalic acid and methylisophthalic acids can be obtained by any known methods, for example by the oxidation of pseudocumene under mild conditions. Methylterephthalic acid and methylisophthalic acid so obtained can be used as a mixture of any desired proportion. Or they may be used separately.

In the following, methylterephthalic acid, methylisophthalic acid or a mixture of these may sometimes be referred to generically as methylphthalic acid.

The methyl-substituted benzenedicarboxylic acid may contain up to 20 mol percent, preferably up to 10 mol percent, of a saturated dicarboxylic acid. Examples of the saturated dicarboxylic acid include aromatic dicarboxylic acids such as terephthalic acid, isophthalic acid, phthalic acid or phthalic anhydride, or aliphatic dicarboxylic acids such as adipic acid, sebacic acid or succinic acid.

The amount of methylphthalic acid used in this invention is 10 to 80 mol percent of the total amount of the dicarboxylic acid component (the total amount of methylphthalic acid and unsaturated dicarboxylic acid), and is also defined by the equation $3/7(x-30) \leq y$ in regard to the mol percent ($x$) of ethylene glycol and/or ethylene oxide in the polyhydric alcohol component.

If the amount of methylphthalic acid is smaller than $y$ mol percent defined by the above equation, turbidity or phase separation occurs when the resulting unsaturated polyester is mixed with a copolymerizable monomer such as styrene, and a uniform unsaturated polyester resin cannot be obtained. Even if the amount of the methylphthalic acid is within the range specified by the above equation, but is smaller than 10 mol percent of the total dicarboxylic acid component, a cured product of the resulting unsaturated polyester cannot have sufficient thermal stability and resistance to chemicals. If the amount of the methylphthalic acid exceeds 80 mol percent, cross-linking reaction for curing the unsaturated polyester obtained becomes insufficient, which results in a reduction in resistance to organic solvents. The preferred amount of the methylphthalic acid is from 20 to 60 mol percent within the range defined by the above equation.

In the practice of the process of this invention, the reaction of the polyhydric alcohol component and the dicarboxylic acid component can be carried out in any desired order. Usually, first the methylphthalic acid is reacted with the polyhydric alcohol, and the resulting product is then reacted with the unsaturated dicarboxylic acid; or all of the reactants are reacted simultaneously.

The reaction conditions are those generally known. For example, the reaction temperature that can be employed is from 150° C. to 300° C. It is preferred that the reaction be carried out in an atmosphere of an inert gas such as carbon dioxide, nitrogen or argon.

When ethylene oxide and/or propylene oxide are used as the polyhydric alcohol component, it is possible to react methylphthalic acid in advance with these alkylene oxide(s) to form adducts of methylphthalic acid and alkylene oxide, and then react ethylene glycol with the adducts and the remaining methylphthalic acid and unsaturated dicarboxylic acid sequentially or simultaneously.

In the preparation of the adduct, it is possible to use a reaction medium, for example, aliphatic and alicyclic hydrocarbons such as benzene, toluene, n-hexane, n-heptane or cyclohexane, ketones such as methyl ethyl ketone or cyclohexanone, ethers such as dioxane, halogenated hydrocarbons such as chloroform or carbon tetrachloride, and mixtures of at least two of them with each other. The reaction can be carried out for example in the presence of a catalyst with or without a solvent at atmospheric or elevated pressures at a temperature of about 10° C. to 300° C.

Examples of suitable catalysts that can be used include tertiary amines such as triethylamine or pyridine, quaternary ammonium salts such as trimethylbenzylammonium chloride or tetraethylammonium bromide, quaternary ammonium hydroxides such as tetraethylammonium hydroxide, and alkali metal salts such as lithium chloride.

When the alkylene oxide adduct of methylphthalic acid prepared by using a reaction medium in the addition reaction is used as one material for the production of an unsaturated polyester, the reaction mixture containing the reaction medium may be directly used and an unsaturated polyester may be produced by the "solvent method." Or it is also possible to remove the reaction medium from the reaction mixture to isolate the alkylene oxide adduct, which can then be used for the preparation of the unsaturated polyester.

The reaction in accordance with the process of this invention can be performed rapidly in a uniform system since the methylphthalic acid has good solubility in glycol.

The unsaturated polyester obtained by the process of this invention gives a homogeneous, stable unsaturated polyester which has good solubility in a copolymerizable monomer such as styrene, and which does not cause turbidity or phase separation. A cured product of the unsaturated polyester resin obtained has very good color and superior resistance to chemicals, thermal resistance, and mechanical properties such as flexural modulus. Especially, an unsaturated polyester prepared by using only ethylene glycol as the polyhydric alcohol component, when cured, has high resistance to organic solvents such as benzene. Accordingly, the unsaturated polyester is mixed with a copolymerizable monomer to form an unsaturated polyester resin, and by curing with a curing agent with the addition, if desired, of an accelerator, a reinforcing agent such as glass fibers, or a filler, a cured product having superior resistance to chemicals and thermal resistance can be obtained.

The unsaturated polyester obtained by the process of this invention is very useful for use as building material, material for building small-sized ships, and materials for cast articles, bathtub, sewage disposal tanks, various pipes and tanks.

Examples of the copolymerizable monomer to be mixed with the unsaturated polyester obtained by the process of this invention include vinyltoluene, styrene, α-methylstyrene, chlorostyrene, t-butylstyrene, methyl methacrylate, and diallyl phthalate. These monomers can be used either alone or as a mixture of two or more of these.

The following Examples will further illustrate the present invention. The measurement of various properties of the unsaturated polyester was conducted in accordance with the following methods.

(1) Solubility

The solubility of the unsaturated polyester in the copolymerizable monomer was determined by the following method.

An unsaturated polyester obtained is cooled, and solidified, and pulverized to small particles having a size of not more than about 5 mm. 60.0 g. of the pulverized unsaturated polyester were mixed with 40 g. of a styrene monomer, and the mixture was stirred for 3 hours at 50° C. to form a solution. The solution was cooled to 20° C., and allowed to stand for 24 hours. At the end of this 24-hour period, the transparency or clarity of the solution was determined.

The determination of clarity was made as follows:

Many standard solutions were prepared by dissolving various amounts (in milligrams) of kaolin having a particle diameter of 200 mesh or less in one liter of pure water, and in each solution, the milligram number of the kaolin was made the turbidity degree of the solution. Thus, for example, a solution of 80 mg. of kaolin in one liter of pure water has a turbidity of 80° C. Other examples include:

| Solution: | Turbidity, degrees |
|---|---|
| 2000 mg. of kaolin in one liter of pure water | 2000 |
| 1000 mg. of kaolin in one liter of pure water | 1000 |
| 1 mg. of kaolin in one liter of pure water | 1 |
| Pure water | 0 |

These standard solutions and the above-mentioned solution of the unsaturated polyester were put into a color comparison tube having a capacity of 100 ml. and a height of 25 cm., and the turbidity of the unsaturated polyester solution was determined by colorimetry in comparison with the standard solutions.

(2) Heat distortion temperature of the cured product

The heat distortion temperature of the cured product was measured in accordance with ASTM 648–45T.

An unsaturated polyester resin obtained by mixing an unsaturated polyester and a copolymerizable monomer was cast into a plate having a thickness of 6.0 mm. A test piece having a width of 12.8 mm. and a length of 125 mm. was cut out from the plate, and the heat distortion temperature of the test piece was measured using an ordinary heat distortion temperature tester. The measurement was conducted under a fiber stress of 18.5 kg./cm.$^2$, raising the bath temperature from 20° C. at a rate of 2° C./min. The temperature which caused a displacement of 25/100 mm. was made a heat distortion temperature.

(3) Flexural modulus of the cure product

The flexural modulus was determined in accordance with ASTM D–790 using the same test piece (thickness 6.0 mm., width 12.8 mm., length 125 mm.) as used for the measurement of heat distortion temperature, by an Instron tester. The rate of load application was 5 mm./min., and the distance between supports was 100 mm., and the flexural modulus was calculated in accordance with the following equation $$E=\frac{l^3}{4wh^3}\left(\frac{P}{Y}\right)$$

where

P is the load in kilograms at breakage of the test piece,
$l$ is the distance between supports (100 mm.)
$w$ is the width in millimeters of the test piece,
$h$ is the thickness in millimeters of the test piece, and
$(P/Y)$ is the inclination of the straight line portion of the stress-strain curve.

(4) Resistance to organic solvents

Benzene was used as the organic solvent, and the resistance to the organic solvent was determined as follows:

The same test piece as used in the determination of the heat distortion temperature was immersed in 10 times (volume/weight) its amount of benzene, and heat-treated for 18 hours at the boiling point (80° C.) of benzene. Thereafter, benzene was wiped off, and the test piece was maintained for 15 minutes in flowing water at 20° C. Water was wiped off, and immediately, the Barcol hardness of the test piece was measured using Barcol Impressor (Model No. 934–1). The resistance to organic solvents was determined by the hardness retention (percent) based on the hardness of the test piece before treatment.

EXAMPLE 1

A reaction vessel equipped with a stirrer, a nitrogen gas inlet, a thermometer and a rectification tower was charged with 180.1 parts of a 60:40 mixture of methylterephthalic acid and 4-methylisophthalic acid and 124.2 parts of ethylene glycol. After thoroughly replacing the atmosphere inside the vessel by nitrogen gas, these compounds were esterified by heating for 6.5 hours at 180–200° C. while flowing a nitrogen gas at a rate of 50 ml./min. The temperature of the reaction system was lowered to 150° C., and 98.1 parts of maleic anhydride were added. Again, the temperature was raised, the polycondensation was performed for 5.0 hours at 190–210° C. There was obtained an unsaturated polyester having an acid value of 25.8.

60 parts of the resulting unsaturated polyester were dissolved in 40 parts of styrene by the method described above. On standing, the solution was uniform and clear without any turbidity (turbidity of 0°).

A styrene solution of the unsaturated polyester prepared similarly (styrene content 40% by weight) was cured with 0.4 part of cobalt naphthenate and 1.0% of a methyl ethyl ketone peroxide solution.

The cured resin had a heat distortion temperature of 91° C., showing superior thermal stability. The resin had a flexural modulus of 378 kg./mm.$^2$, showing superior mechanical properties. After boiling the cured resin for 18 hours in benzene, the Barcol hardness retention of the resin was 68%, showing superior resistance to organic solvents.

Comparative Example 1

The same reaction vessel as used in Example 1 was charged with 148.1 parts of phthalic anhydride, 98.1 parts of maleic anhydride and 124.2 parts of ethylene glycol. After purging the vessel with nitrogen gas, polycondensation was performed by heating at 190–210° C. for 7.0 hours.

The resulting unsaturated polyester (acid value 31.2) was mixed with styrene in the same way as set forth in Example 1 to form an unsaturated polyester resin. After cooling and standing for 24 hours, the resin became turbid to a turbidity of 1600 to 1800°. After additional three days, a white precipitate was separated.

This means that in this example, it was impossible to obtain a homogeneous unsaturated polyester resin.

Comparative Example 2

The same reaction vessel as used in Example 1 was charged with 166.1 parts of isophthalic acid and 124.2 parts of ethylene glycol. After purging the atmosphere inside the vessel with nitrogen gas, these compounds were heated at 180–200° C. for 8.0 hours. The reaction mixture was cooled to 150° C., and 98.1 parts of maleic anhydride were added. Polycondensation was carried out in the same manner as in Example 1.

In the same way as set forth in Example 1, the resulting unsaturated polyester (acid value 26.0) was mixed with styrene. The resulting unsaturated polyester resin exhibited a turbidity of more than 2000° upon standing after cooling. One day later, a white precipitate was separated.

This means that in this example, a homogeneous unsaturated polyester resin could not be obtained.

Comparative Example 3

The same reaction vessel as used in Example 1 was charged with 72.0 parts of a 60:40 mixture of methylterephthalic acid and 4-methylisophthalic acid, 99.7 parts of terephthalic acid and 124.2 parts of ethylene glycol. After purging the vessel with nitrogen gas, these compounds were heated at 180–210° C. for 12.0 hours. After cooling the reacton mixture to 150° C., 98.1 parts of maleic anhydride were added. Again, the temperature was raised, and the reaction mixture was maintained at 190–210°C. for 5.0 hours to conduct polycondensation reaction. The resulting unsaturated polyester (acid value 27.2) was mixed with styrene in the same way as in Example 1. The mixture was cooled, and allowed to stand. In 24 hours, the mixture became turbid to a turbidity of about 1200°.

This means that in this example, a homogeneous transparent unsaturated polyester resin cannot be obtained by the use of a great quantity of terephthalic acid.

Example 2

The same reaction vessel as used in Example 1 was charged with 72.0 parts of a 60:40 mixture of methylterephthalic acid and 4-methylisophthalic acid, 74.5 parts of ethylene glycol and 60.9 parts of propylene glycol. After purging the vessel with nitrogen gas, these compounds were heated at 180–200° C. for 6.0 hours. The reaction mixture was cooled to 150° C., and then 157.0 parts of maleic anhydride were added. Again, the temperature was raised, and the reaction mixture was maintained at 190–210° C. for 6.0 hours to perform polycondensation. The resulting unsaturated polyester (acid value 27.4) was mixed with styrene to form an unsaturated polyester resin (styrene content 40% by weight). The turbidity was measured in the same way as in Example 1, and found to be 0° which meant that the solution was substantially clear.

When this unsaturated polyester resin was cured in the same way as in Example 1, the resulting cured resin had a heat distortion temperature of 142° C., showing very superior thermal stability. The Barcol hardness retention of the cured resin after immersion in benzene in the same way as in Example 1 was 88%, showing very superior resistance to chemicals.

Comparative Example 4

A stainless steel pressure vessel equipped with a stirrer, a thermometer, a manometer and a rectification tower was charged with 66.4 parts of terephthalic acid, 74.5 parts of ethylene glycol and 60.9 parts of propylene glycol. After purging the vessel with nitrogen gas, the reaction mixture was heated under a nitrogen gas pressure of 1.5 kg./cm.$^2$·G, and maintained at 200–220° C. for 4 hours. After the reaction, the contents of the vessel were withdrawn, and transferred to the same reaction vessel as used in Example 1. 157.0 parts of maleic anhydride were added, and the reaction mixture was heated at 190–210° C. for 6.0 hours while flowing a nitrogen gas to perform polycondensation reaction.

The resulting unsaturated polyester (acid value 28.0) was mixed with styrene in the same way as set forth in Example 1. The resulting unsaturated polyester resin became turbid to a turbidity of 1200–1400°, and it was impossible to obtain a homogeneous unsaturated polyester resin.

When the turbid unsaturated polyester resin was cured in the same manner as in Example 1, the resulting cured product had a Barcol hardness retention, after boiling in benzene, of only less than 50%, showing poor resistance to organic solvents.

Example 3

The same reaction vessel as used in Example 1 was charged with 216.1 parts of a 60:40 mixture of methylterephthalic acid and 4-methylisophthalic acid and 124.2 parts of ethylene glycol. After purging the vessel with nitrogen gas, these compounds were maintained at 180–200° C. for 7.0 hours to perform esterification reaction. The esterification product was cooled to 150° C., and 78.5 parts of maleic anhydride were added. Again, the temperature was raised, and the reaction mixture was maintained at 190–210° C. for 5.0 hours to perform polycondensation. The resulting unsaturated polyester (acid value 22.4) was mixed with styrene to form an unsaturated polyester resin (styrene content 40% by weight). The resin was uniform and clear with a turbidity of 0°.

The resin was cured in the same way as in Example 1. The cured resin had a heat distortion temperature of 98° C., showing excellent thermal stability, and a flexural modulus of 392 kg./mm.$^2$ showing excellent mechanical properties.

Comparative Example 5

Polycondensation reaction was performed substantially the same as in Example 3 except that 199.3 parts of isophthalic acid were used instead of the mixture of methylterephthalic acid and 4-methylisophthalic acid. The resulting unsaturated polyester (acid value 23.6) was mixed with styrene in the same way as in Example 1. On standing for 24 hours, the unsaturated polyester resin showed a turbidity of more than 2000°, and after an additional three days, a white precipitate was separated. This means that in this example, a homogeneous resin cannot be obtained.

Example 4

The same reaction vessel as used in Example 1 was charged with 180.1 parts of methylterephthalic acid, 111.8 parts of ethylene glycol and 15.2 parts of propylene glycol, and esterification reaction was performed the same as in Example 1. The reaction mixture was cooled to 150° C., and 98.1 parts of maleic anhydride were added. The mixture was heated at 190–210° C. for 5.0 hours to perform polycondensation. The resulting unsaturated polyester (acid value 26.1) was mixed with styrene in the same way as set forth in Example 1 to form an unsaturated polyester resin (styrene content 40% by weight). The resin had a turbidity of less than 50° and was almost clear.

The above-mentioned unsaturated polyester resin was cured in the same way as set forth in Example 1. The cured product had a heat distortion temperature of 105° C. and a flexural modulus of 380 kg./mm.$^2$.

Example 5

The same reaction vessel as used in Example 1 was charged with 180.1 parts of 4-methylisophthalic acid and 124.2 parts of ethylene glycol to perform esterification reaction in the same way as in Example 1. The reaction mixture was cooled to 150° C., and 98.1 parts of maleic anhydride was added. The mixture was heated at 190–210° C. for 5.0 hours to perform polycondensation. The resulting unsaturated polyester (acid value 26.0) was mixed with styrene (styrene content 40% by weight). The resin was clear with a turbidity of 0°. When this unsaturated polyester resin was cured in the same way as in Example 1, the cured resin had a heat distortion temperature of 80° C. and a flexural modulus of 398 kg./mm.$^2$. When the cured resin was immersed in benzene in the same way as in Example 1, the Barcol hardness retention of the cured resin was 68%.

Comparative Example 6

The same reaction vessel as used in Example 1 was charged with 148.1 parts of phthalic anhydride, 98.1 parts of maleic anhydride and 159.8 parts of propylene glycol. After purging the vessel with nitrogen gas, the reaction product was maintained at 190–210° C. for 7.0 hours to form an unsaturated polyester having an acid value of 30.5. The unsaturated polyester was mixed with styrene in the same way as in Example 1 to form an unsaturated polyester resin (styrene content 40% by weight) which had a turbidity of 0° and was clear. This unsaturated polyester resin was cured in the same way as in Example 1. The cured resin was immersed in the same way as in Example 1. The Barcol hardness retention of the cured product was 0%, showing very poor resistance to organic solvents.

Comparative Example 7

The same reaction vessel as used in Example 1 was charged with 166.1 parts of isophthalic acid and 167.4 parts of propylene glycol. After purging the vessel with nitrogen gas, the reaction mixture was heated to 180–200° C. for 8.0 hours to perform esterification reaction. The esterified product was cooled to 150° C., and 98.1 parts of maleic anhydride was added. The mixture was heated at 190–210° C. for 5.0 hours to perform polycondensation. The resulting unsaturated polyester (acid value 27.1) was mixed with styrene to form an unsaturated polyester resin (styrene content 40% by weight) which was then cured in the same way as in Example 1.

The resulting cured resin had a Barcol hardness retention, after treatment with benzene, of 0%.

Comparative Example 8

The same reaction vessel as used in Example 1 was charged with 180.1 parts of a 60:40 mixture of methylterephthalic acid and 4-methylisophthalic acid and 167.4 parts of propylene glycol, and these compounds were esterified at 180–200° C. for 8.0 hours. The esterification product was cooled to 150° C., and 98.1 parts of maleic anhydride was added. Again, the mixture was heated at 190–210° C. for 5.0 hours to form an unsaturated polyester having an acid value of 25.3. This unsaturated polyester was mixed with styrene to form an unsaturated polyester resin (styrene content of 40% by weight), and cured in the same way as in Example 1.

The cured resin had a Barcol hardness, after treatment with benzene, of 6%.

Example 6

The same reaction vessel as used in Example 1 was charged with 180.1 parts of a 60:40 mixture of methylterephthalic acid and 4-methylisophthalic acid, 74.5 parts of ethylene glycol and 84.4 parts of diethylene glycol. After purging the vessel with nitrogen gas, these compounds were esterified at 180–200° C. for 6.5 hours. The esterification product was cooled to 150° C., and 98.1 parts of maleic anhydride were added. The temperature was again raised, and the mixture was heated at 190–210° C. for 5.0 hours to perform polycondensation to form an unsaturated polyester having an acid value of 22.8. This unsaturated polyester was mixed with styrene to form an unsaturated polyester resin (styrene content 40% by weight), and cured in the same way as in Example 1.

The resulting cured resin had a heat distortion temperature of 60° C., and a flexural modulus of 361 kg./mm.$^2$.

Comparative Example 9

The same reaction vessel as used in Example 1 was charged with 180.1 parts of a 60:40 mixture of methylterephthalic acid and 4-methylisophthalic acid, 37.3 parts of ethylene glycol and 106.5 parts of propylene glycol. After purging the vessel with nitrogen gas, these compounds were heated at 180–200° C. for 6.5 hours. The esterification product was cooled to 150° C., and 98.1 parts of maleic anhydride was added. The temperature was again raised, and the mixture was maintained at 190–210° C. for 5.0 hours to perform polycondensation reaction. The resulting unsaturated polyester (acid value 25.8) was mixed with styrene in the same way as in Example 1 to form an unsaturated polyester resin.

The resulting resin was cured in the same way as in Example 1. The cured product had a Barcol hardness retention, after boiling in benzene, of less than 40%, showing poor resistance to organic solvents.

Example 7

(A) A stainless steel pressure reactor equipped with a stirrer was charged with 50.0 parts of a 60:40 mixture of methylterephthalic acid and 4-methylisophthalic acid, 150 parts of toluene, 26.9 parts (2.2 molar times said acid mixture) of ethylene oxide and 0.14 part (0.5 mol percent based on said acid mixture) of triethylamine. After purging with nitrogen gas, the reactor was sealed, and these compounds were heated at 160° C. for 40 minutes. After cooling, the contents were taken out, and heated under reduced pressure to evaporate off toluene and an excess of ethylene oxide to form a light yellow viscous liquid which was an adduct of ethylene oxide with the mixture of methylterephthalic acid and 4-methylisophthalic acid. The conversion measured from the acid value of the reaction product, was 95.4% based on the fed mixture of acids.

(B) A polymerization vessel equipped with a stirrer, a nitrogen gas inlet, a thermometer and a partially circulating rectifying tower was charged with 134.0 parts of the adduct of ethylene oxide with the acid mixture obtained in (A) above, 49.0 parts of maleic anhydride and 6.2 parts of ethylene glycol. After purging the vessel with nitrogen gas, these compounds were heated while flowing nitrogen gas at a rate of 100 ml./min., and maintained at 190–210° C. for 6.0 hours. After cooling, the resulting unsaturated polyester (acid value 24.8) was dissolved in styrene to form an unsaturated polyester resin (styrene content 40%).

(C) 1.0 part of methyl ethyl ketone peroxide and 0.4 part of cobalt naphthenate were added to 100 parts of the unsaturated polyester resin obtained in (B) above, and the resin was cured for 2 hours at 25° C., and maintained for 2 hours in an air-circulating heater at 120° C.

The cured resin obtained had a heat distortion temperature of 101° C., showing superior thermal stability, and had a Barcol hardness retention, after boiling in benzene in the same way as in Example 1, of 71%, showing good resistance to organic solvents.

Example 8

The same reaction vessel as used in Example 1 was charged with 108.1 parts of a 60:40 mixture of methylterephthalic acid and 4-methylisophthalic acid, 105.6 parts of ethylene glycol and 22.8 parts of propylene glycol. After purging the vessel with nitrogen gas, these compounds were heated at 180–200° C. for 6.0 hours to perform esterification reaction. The esterification product was cooled to 150° C., and 137.3 parts of maleic anhydride were added. The mixture was maintained at 190–210° C. for 5.5 hours to perform polycondensation reaction to form an unsaturated polyester (acid value 26.8). This resin was mixed with styrene to form an unsaturated polyester resin (styrene content 40% by weight), and cured in the same way as in Example 1.

The resulting cured resin had a heat distortion temperature of 131° C., showing good thermal stability, and a Barcol hardness retention, after boiling in benzene for 18 hours, of 92%, showing excellent resistance to organic solvents.

Example 9

The same reaction vessel as used in Example 1 was charged with 144.1 parts of a 60:40 mixture of methyl-terephthalic acid and 4-methylisophthalic acid, 33.2 parts of isophthalic acid, 111.8 parts of ethylene glycol and 15.2 parts of propylene glycol. After purging with nitrogen gas, these compounds were heated at 180–200° C. for 6.5 hours to perform esterification reaction. The esterification reaction was cooled to 150° C., and 98.1 parts of maleic anhydride was added. The mixture was maintained at 190–210° C. for 5.5 hours to perform polycondensation. The resulting unsaturated polyester (acid value 25.1) was mixed with styrene in the same way as in Example 1 to form an unsaturated polyester resin. The resin was clear with a turbidity of 0°.

The unsaturated polyester resin was cured in the same way as in Example 1. The cured product had a heat distortion temperature of 98° C., showing excellent thermal stability, and a Barcol hardness retention, after immersion in benzene, of 72%, showing excellent resistance to organic chemicals.

The results obtained in the above Examples and Comparative Examples are shown in the following table for ease of evaluation.

nent composed of 90 to 20 mol percent of an unsaturated aliphatic dicarboxylic acid or its acid anhydride and 10 to 80 mol percent of a methyl-substituted benzenedicarboxylic acid which may contain up to 20 mol percent of another saturated dicarboxylic acid, the amounts of said ethylene glycol and/or ethylene oxide and said methyl-substituted benzenedicarboxylic acid being defined by the following formula $$3/7(x-30) \leq y$$

wherein $x$ is the mol percent of the ethylene glycol and/or ethylene oxide in said polyhydric alcohol component, and $y$ is the mol percent of the methyl-substituted benzenedicarboxylic acid in said dicarboxylic acid component.

2. The process of claim 1, wherein up to 50 mol percent of said polyhydric alcohol component consists of propylene glycol and/or propylene oxide, and 50 to 100 mol percent thereof consists of ethylene glycol and/or ethylene oxide.

3. The process of claim 1, wherein 70 to 100 mol percent of said polyhydric alcohol component consists of ethylene glycol and/or ethylene oxide.

4. The process of claim 1, wherein up to 30 mol percent of said polyhydric alcohol component consists of propylene glycol and/or propylene oxide, and 70 to 100 mol percent thereof consists of ethylene glycol and/or ethylene oxide.

5. The process of claim 1, wherein the amount of the methyl-substituted benzenedicarboxylic acid is 20 to 60 mol percent.

6. The process of claim 1, wherein said methyl-substituted benzenedicarboxylic acid is selected from the group consisting of methylterephthalic acid, 4-methylisophthalic acid and 5-methylisophthalic acid.

| | Composition (molar percent) | | | | Turbidity of the resin (styrene content 40 weight percent), degrees | Properties of cured resin | | |
|---|---|---|---|---|---|---|---|---|
| | Dicarboxylic acid component | | | Glycol component | | | | Resistance to organic solvents (B-hardness retention, percent) |
| | Methyl-phthalic acid | Other acid | Unsaturated acid (MA) | Ethylene glycol | Other glycol | | Heat distortion temperature (° C.) | Flexural modulus (kg./mm.²) | |
| Example 1 | MIX 50 | | 50 | 100 | | 0 | 91 | 378 | 68 |
| Comparative: | | | | | | | | | |
| 1 | | PA 50 | 50 | 100 | | 1,600–1,800 | Not measurable because of the impossibility of fabrication | | |
| 2 | | IPA 50 | 50 | 100 | | >2,000 | | | |
| 3 | MIX 20 | TA 30 | 50 | 100 | | ~1,200 | | | |
| Example 2 | MIX 20 | | 80 | 60 | PG 40 | 0 | 142 | | 83 |
| Comparative 4 | | TA 20 | 80 | 60 | PG 40 | 1,200–1,400 | | | <50 |
| Example 3 | MIX 60 | | 40 | 100 | | 0 | 98 | 392 | |
| Comparative 5 | | IPA 60 | 40 | 100 | | >2,000 | Not measurable because of the impossibility of fabrication | | |
| Example: | | | | | | | | | |
| 4 | MTA 50 | | 50 | 90 | PG 10 | 0 | 105 | 380 | |
| 5 | MIA 50 | | 50 | 100 | | 0 | 80 | 398 | 68 |
| Comparative: | | | | | | | | | |
| 6 | | PA 50 | 50 | | PG 100 | 0 | | | 0 |
| 7 | | IPA 50 | 50 | | PG 100 | 0 | | | 0 |
| 8 | MIX 50 | | 50 | | PG 100 | 0 | | | 0 |
| Example 6 | MIX 50 | | 50 | 60 | DEG 40 | 0 | 60 | 361 | |
| Comparative 9 | MIX 50 | | 50 | 30 | PG 70 | 0 | | | <40 |
| Example: | | | | | | | | | |
| 7 | MIX 50* | | 50 | *(100) | | 0 | 101 | | 71 |
| 8 | MIX 30 | | 70 | 85 | PG 15 | 0 | 131 | | 92 |
| 9 | MIX 40 | IPA 10 | 50 | 90 | PG 10 | 0 | 98 | | 72 |

*Ethylene oxide adduct.

NOTE.—PA=Phthalic anhydride; IPA=Isophthalic acid; TA=Terephthalic acid; MA=Maleic anhydride; PG=Propylene glycol; MTA=Methylterephthalic acid; MIA=4-Methylisophthalic acid; MIX=Mixture of MTA and MIA (60/40); DEG=Diethylene glycol.

What we claim is:

1. In a process for producing an unsaturated polyester by reacting a polyhydric alcohol component comprising ethylene glycol and another glycol or an alkylene oxide with a dicarboxylic acid component composed of an unsaturated aliphatic dicarboxylic acid and a benzenedicarboxylic acid at an elevated temperature, the improvement which comprises reacting a polyhydric alcohol component composed of not more than 50 mol percent of a compound selected from the group consisting of propylene glycol, propylene oxide, diethylene glycol and dipropylene glycol and 50 to 100 mol percent of ethylene oxide and/or ethylene glycol with a dicarboxylic acid compo- 7. The process of claim 1, wherein said unsaturated dicarboxylic acid is an unsaturated dicarboxylic acid or its anhydride having 4 to 6 carbon atoms.

8. The process of claim 7, wherein said unsaturated dicarboxylic acid is selected from the group consisting of maleic anhydride, maleic acid and fumaric acid.

9. The process of claim 1, wherein the reaction between the polyhydric alcohol component and the dicarboxylic acid component is carried out by first reacting the polyhydric alcohol component with the methyl-substituted benzenedicarboxylic acid, and then reacting the reaction product with the unsaturated aliphatic dicarboxylic acid or its anhydride.

10. A composition in the form of solution comprising the unsaturated polyester obtained by the process of claim 1 and a copolymerizable monomer.

References Cited

UNITED STATES PATENTS

| | | | |
|---|---|---|---|
| 2,742,445 | 4/1956 | Lum | 260—861 |
| 2,904,533 | 9/1959 | Carlston et al. | 260—75 |
| 3,160,678 | 12/1964 | Lew | 260—861 |
| 3,196,131 | 7/1965 | Mayer et al. | 260—75 |
| 3,300,544 | 1/1967 | Parker | 260—866 |
| 3,345,339 | 10/1967 | Parker et al. | 260—75 |
| 3,435,094 | 3/1969 | Parker | 260—872 |

WILLIAM H. SHORT, Primary Examiner

E. A. NIELSEN, Assistant Examiner

U.S. Cl. X.R.

260—75 EP, 75 UA

UNITED STATES PATENT OFFICE
CERTIFICATE OF CORRECTION

Patent No. 3,819,760    Dated June 25, 1974

Inventor(s) AITO, ET AL.

It is certified that error appears in the above-identified patent and that said Letters Patent are hereby corrected as shown below:

In the heading, insert:

-- Claims priority, application Japan, filed July 19, 1971, No. 71/53674 --

Signed and sealed this 8th day of October 1974.

(SEAL)
Attest:

McCOY M. GIBSON JR.
Attesting Officer

C. MARSHALL DANN
Commissioner of Patents